United States Patent
Beyabani et al.

(10) Patent No.: US 8,387,081 B2
(45) Date of Patent: Feb. 26, 2013

(54) DYNAMIC PRICING FOR PAY-PER-VIEW EVENTS

(75) Inventors: Syed Zafar Beyabani, Irving, TX (US); Yuriy Bolyukh, Trophy Club, TX (US); Aamer Charania, Flower Mound, TX (US)

(73) Assignee: Verzion Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 12/369,279

(22) Filed: Feb. 11, 2009

(65) Prior Publication Data
US 2010/0205625 A1    Aug. 12, 2010

(51) Int. Cl.
H04N 7/16 (2011.01)
H04N 7/173 (2011.01)
G06Q 30/00 (2012.01)

(52) U.S. Cl. ............................ 725/8; 705/7.35; 705/14.1
(58) Field of Classification Search .............. 725/8, 104, 725/46; 705/7.35, 14.1
See application file for complete search history.

(56) References Cited

U.S. PATENT DOCUMENTS

| 6,057,872 A * | 5/2000 | Candelore | 725/23 |
| 7,340,759 B1 * | 3/2008 | Rodriguez | 725/8 |
| 2001/0014868 A1 * | 8/2001 | Herz et al. | 705/14 |
| 2002/0169724 A1 * | 11/2002 | Moroney et al. | 705/52 |
| 2007/0011039 A1 * | 1/2007 | Oddo | 705/10 |
| 2007/0055554 A1 * | 3/2007 | Sussman et al. | 705/5 |
| 2007/0250844 A1 * | 10/2007 | Collacott | 725/8 |
| 2009/0248517 A1 * | 10/2009 | Tran et al. | 705/14 |
| 2009/0249412 A1 * | 10/2009 | Bhogal et al. | 725/104 |

* cited by examiner

*Primary Examiner* — Hoang-Vu A Nguyen-Ba (57) ABSTRACT

A method performed by one or more devices within a subscription television network that offers pay-per-view programming to viewers includes receiving criteria for triggering dynamic pricing discounts for a pay-per-view event and establishing, based on the received criteria, dynamic prices for the pay-per-view event. The method also includes offering, to the viewers over the subscription television network, the pay-per-view event at one of the established dynamic prices.

20 Claims, 7 Drawing Sheets

DYNAMIC PRICING FOR PAY-PER-VIEW EVENTS

BACKGROUND INFORMATION

Television service providers seek to generate maximum revenue from their products offered to subscribers. In addition to content provided as part of regular subscription packages, providers may offer premium programming, such as pay-per-view (PPV) events, to subscribers for additional charges.

PPV may allow subscribers to purchase events to be viewed and pay for the private telecast of that event to their television or other display device. PPV events are generally broadcast simultaneously, as opposed video-on-demand (VOD) purchases, which allow subscribers to see the ordered programming at any time. PPV may utilize the Internet, intranets, and/or a multitude of other networks. PPV content can be obtained using many different electronic devices, such as, telephones, personal digital assistants (PDAs), personal computers, set-top boxes (STBs), portable media devices, etc.

PPV events are typically offered to subscribers at a fixed price for the duration of the event. Thus, subscribers ordering a three-hour PPV event pay the same price whether ordering in advance or ordering during the last hour of the event.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription television service to offer dynamic discount pricing of pay-per-view (PPV) events to customers. Prices for individual PPV events may be adjusted dynamically based on a variety of factors, including historical trends, real-time customer activity, stored viewer profiles, event durations, and actual times. Price adjustments may be applied to individual customers, subsets of customers, or all customers. Video clients, such as set-top boxes (STBs), for the subscription television service may identify particular viewer actions (e.g., programs watched, searches performed, and/or programs ordered) and provide data over a network to a server for the subscription television service. An operator may identify revenue criteria, such a target take rates, for each PPV event. The server may incorporate the data from the video client and the revenue criteria from the operator to generate dynamic PPV event pricing that can be offered to some or all subscribers.

As used herein, the term "video client" may refer to any media processing device that may receive multimedia content over a network, and may provide such multimedia content to an attached video display device (such as a television or monitor). Also, the terms "pay-per-view event" and "PPV event," as used herein, may refer interchangeably to any multimedia content, such as video, games and/or music that can be streamed or downloaded to one or more videos client for a particular period upon request by a viewer. As used herein, the terms "pay-per-view order," "PPV order," and "PPV event order" may refer to a customer request to view a PPV event at a designated price. The term "take rate," as used herein, may refer to the percentage of total subscribers who purchase a particular PPV event. Also, as used herein, the terms "viewer," "user," "subscriber," and "customer" may refer interchangeably to a person who interacts with, orders, views, listens to, or plays a PPV event.

Figure 1:
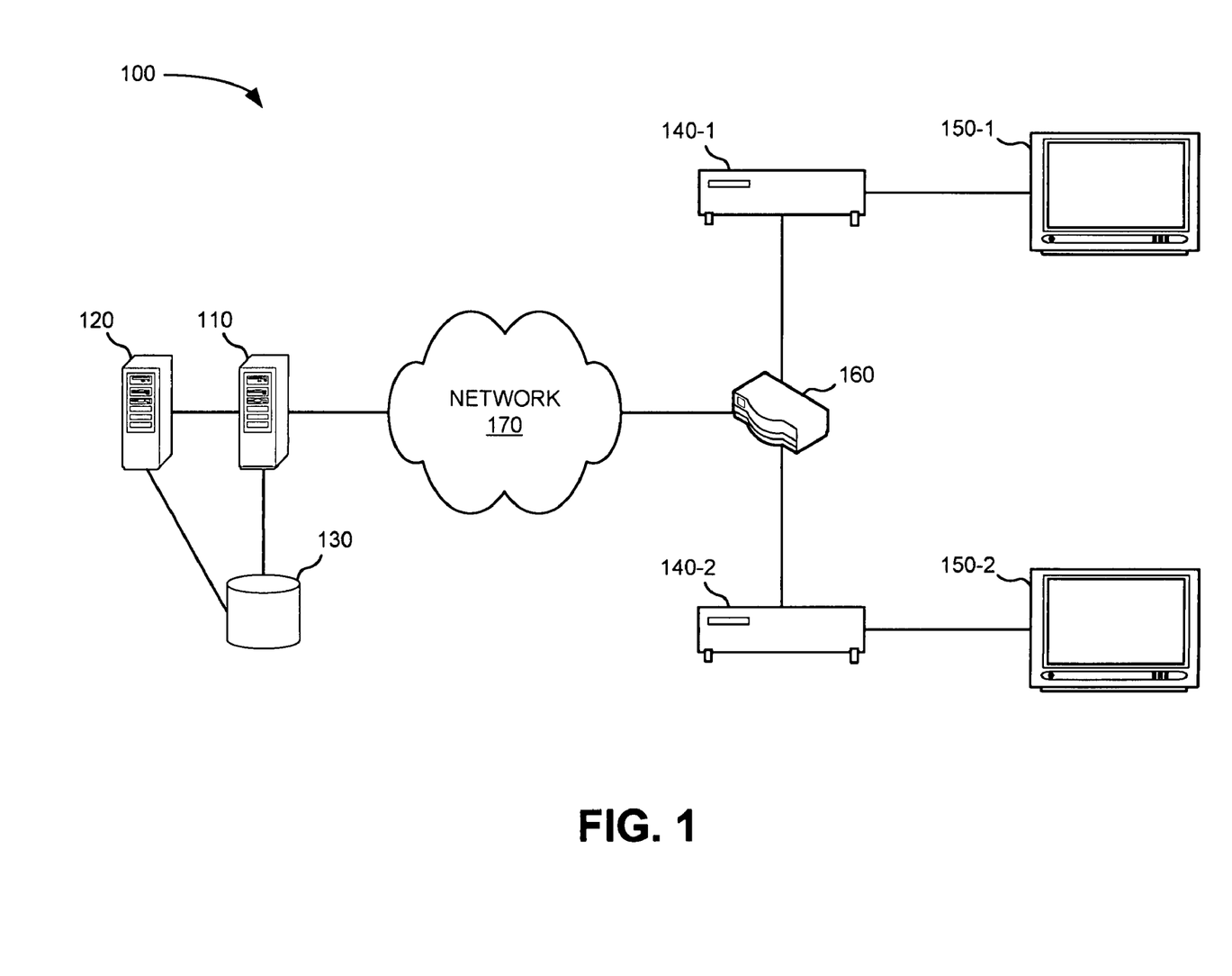
FIG. 1 depicts an exemplary network in which systems and/or methods described herein may be implemented.

FIG. 1 is a diagram of an exemplary network 100 in which systems and/or methods described herein may be implemented. As illustrated, network 100 may include a backend server 110, an analysis server 120, a database 130, video clients 140-1 and 140-2 (herein referred to collectively as "video clients 140" and generically as "video client 140"), video display devices 150-1 and 150-2 (herein referred to collectively as "video display devices 150" and generically as "video display device 150"), a local gateway 160, and a network 170. Video clients 140, video display devices 150 and gateway 160 may be located on a customer's premises and be connected via network 170 to server 110 at, for example, a subscription television service provider's premises. Components of network 100 may interconnect via wired and/or wireless connections. For simplicity, a single backend server 110, analysis server 120, database 130, network 170, and local gateway 160 with two video clients 140 and two video display devices 150 have been illustrated in FIG. 1. In practice, there may be more networks, servers, local gateways, video clients, and/or video display devices. Also, in some instances, one or more of the components of network 100 may perform one or more functions described as being performed by another one or more of the components of network 100.

In general, backend server 110 may provide control over (e.g., via network 170) television services for devices, such as video display devices 150 and/or other network connectivity devices (e.g., Internet and telephone, not shown) provided at the customer's premises. As further shown in FIG. 1, backend server 110 may connect to a database 130 to store and/or retrieve customer data.

Backend server 110 may include one or more devices for providing content/information to video client 140 and/or video display device 150 in accordance with commands that are issued from video client 140. Examples of backend server 110 may include a headend device that provides broadcast television programs and/or PPV events, a video-on-demand (VOD) device or other device that provides multimedia content upon request, and a program guide information server that provides information related to multimedia content available to video client 140. Backend server 110 may also receive information from one or more video clients, such as recorded information from video client 140 that may include viewing histories tracked by video client 140. Backend server 110 may store the information from the video clients in, for example, a database, such as database 130.

Analysis server 120 may include one or more server entities that are capable of performing statistical analysis on data stored, for example, in database 130. Analysis server 120 may retrieve data from database 130 to analyze the data and combine related video clients into groups (also referred to herein as "clusters") based on pattern analysis and correlation. Analysis server 120 may also receive and/or apply criteria to implement dynamic discount pricing for PPV events. In one exemplary implementation, analysis server 120 may apply various criteria to generate a discount function for a particular PPV event. In another implementation, analysis server may incorporate static criteria and/or thresholds to determine PPV discounts. In one implementation, analysis server 120 may provide price information derived from the discount function or static criteria to backend server 110 to pass on to particular video clients 140 (e.g., customers associated with the video clients). While shown as two separate components in FIG. 1, in other implementations, backend server 110 and analysis server 120 may be combined as a single server or each distributed among multiple servers.

Database 130 may include one or more memory devices that maintain program information (such as PPV event information) and entries relating to subscribers' viewing histories. For example, database 130 may include PPV-related data, such as PPV event categories (e.g., concerts, team sports, wrestling, boxing, martial arts, etc.), PPV events associated by a series (e.g., a PPV event "SuperFight 18" may be associated with its seventeen predecessors), base event pricing, targeted take rates, etc. Database 130 may also store information that server 110 receives from one or more video clients (e.g., video clients 140). In one implementation, database 130 may include exemplary fields, such as a user-identification field, a date field, a time field, a channel field, and/or a program identification field. While only one database is shown in FIG. 1, database 130 may include multiple databases stored locally at server 110 and/or stored at one or more different and possibly remote locations. Database 130 may group customers' viewing history by users and/or user groups and/or by program (e.g., to track program popularity). Database 130 may maintain additional or different information relating to programs watched, recorded, and/or ordered by viewers.

Video client 140 may include a device for selecting and/or obtaining content that may be shown or played on video display device 150. Examples of video client 140 may include a set-top box, a computer, a cable card, and a portable electronic device. Video client 140 may receive a television signal from gateway 160, may convert the signal to a form usable by video display device 150, and may transmit the signal to video display device 150 for display. Video client 140 may further allow a user to alter the programming provided to video display device 150 based on a signal (e.g., a channel up or channel down signal) from, for example, a remote control (not shown). Video client 140 may also be capable of sending data to server 110. In some implementations, video client 140 may be incorporated into video display device 150, such as a television, a computer, or a portable electronic device.

In one implementation, video client 140 may track information relating to programs provided to video display device 150 (or to other devices (not shown), such as a video cassette recorder (VCR), a digital video recorder (DVR), an external storage device, or a remote streaming video viewing device). Video client 140 may provide some or all of the tracked program viewing/recording information to a server, such as backend server 110. Video client 140 may also obtain tracked program viewing/recording information and provide the obtained program viewing/recording information to video display device 150. Video client 140 may obtain tracked program viewing/recording information from an internal memory and/or from backend server 110.

Video display device 150 may include a digital or analog display via which a user may view VOD programs. Video display device 150 may refer to any device that can receive and display multimedia content delivered over network 170 for perception by users. Video display device 150 may include technologies, such as cathode ray tube (CRT) displays, liquid crystal displays (LCDs), light-emitting diode (LED) displays, plasma displays, etc.

Gateway 160 may include a network device that provides an interface from network 170 to video clients 140 and other network connectivity devices (not shown). For example, when telecommunication services are provided to the customer's premises via an optical fiber, gateway 160 may include an optical network terminal (ONT) that connects to the optical fiber. The ONT may convert between signals appropriate for video display device 150 and signals appropriate for transmission over optical fiber. For example, the ONT may include a coaxial cable connection that leads to video display device 150 or video client 140. The ONT may also include an Ethernet output port that connects to a personal computer or a VoIP telephone and/or a standard telephone port for connecting to a standard telephone.

Gateway 160 may include one of a number of possible gateway devices, including a satellite antenna and receiver, a coaxial cable connection, an ONT, or a broadband access for Internet Protocol TV (IPTV). The satellite antenna and receiver may provide an interface for television service broadcast from satellites. The coaxial cable connection may provide an interface for television service connected to a customer via coaxial cables. The ONT may provide an interface for an optical fiber connection. The broadband IPTV access may generally include any device that provides broadband access over which television service may be provided.

Network 170 may include a local area network (LAN), a wide area network (WAN), such as a cellular network, a satellite network, a fiber optic network, or the Internet, a private WAN, or a combination of the Internet and a private WAN, etc. that is used to transport data. Although shown as a single element in FIG. 1, network 170 may include a number of separate networks that function to provide services to devices, such as video display device 150, at a customer's premises. In one implementation, network 170 may terminate at the customer's premises via an optical communication link, such as an optical fiber provided to the customer's premises. In another possible implementation, network 170 may terminate at the customer's premises via a coaxial cable. In still another implementation, network 170 may terminate at the customer's premises via a wireless (e.g., satellite) connection.

In an exemplary implementation, video display device 150 and video client 140 may be connected through one or more audio/video (AV) devices (not shown), such as an audio/video receiver, a video amplifier, video switches, a videocassette recorder (VCR), a digital video recorder (DVR), and/or a digital video disc (DVD) players. In general, AV devices may represent any audio or video equipment that a customer installs to provide additional audio/video capabilities or to enhance the capabilities of existing equipment. Additionally, although two video clients 140 and video display devices 150 are shown in FIG. 1, any particular customer's premises may include any number of devices capable of displaying multimedia content. Further, although two video display devices for a single customer's premises are shown in FIG. 1, server 110 may interact with many customers' premises and/or their video clients and video display devices.

In implementations described herein, backend server 110 may receive viewing history data from video clients 140 and store the data in database 130. In some implementations, viewing history data (also referred to herein a "historical data") may also include customer demographics, customer responses to surveys, program guide searches, and/or other user input. Using the viewing history data, analysis server 120 may sort video clients 140 into clusters, based on, for example, common viewing tendencies. Analysis server 120 may build and/or retrieve a tendency profile for each of the clusters. A tendency profile may include predicted actions for viewers within each of the clusters. Analysis server 120 and/or backend server 110 may then establish a PPV discount function and/or static criteria for every PPV event (or event segment). Based on the established PPV discount function and/or static criteria, backend server 110 may direct discounted PPV pricing announcements to particular video clients (e.g., video clients within particular clusters) or all subscribers' video clients. In some implementations, the PPV discount pricing may be changed as time progresses to or through, for example, a particular PPV event.

Figure 2:
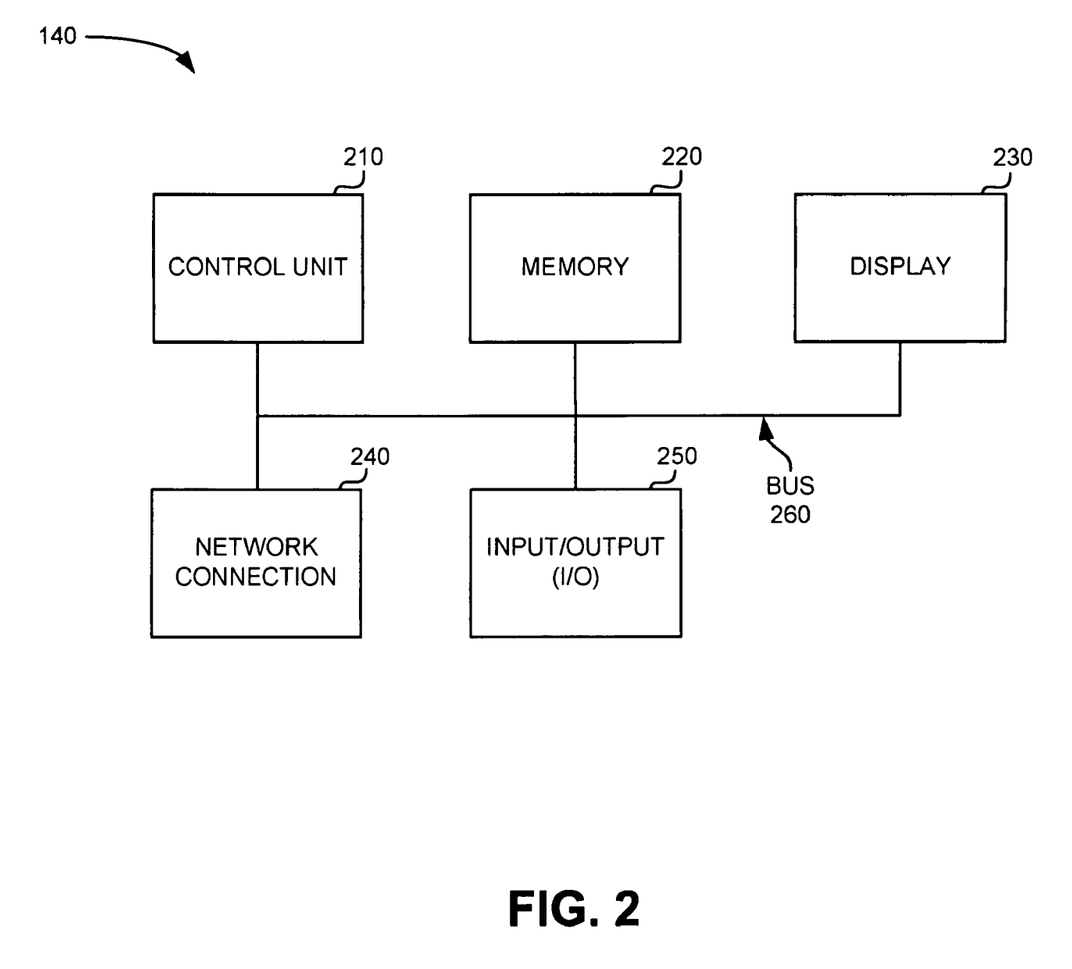
FIG. 2 is a block diagram of exemplary components of a video client that may be used in the network of FIG. 1.

FIG. 2 is diagram illustrating exemplary components of video client 140. As shown, video client 140 may include a control unit 210, a memory 220, a display 230, a network connection 240, an input/output (I/O) component 250, and a bus 260.

Control unit 210 may include a processor, microprocessor, or another type of processing logic that interprets and executes instructions. Among other functions, control unit 210 may collect and store viewer activity associated with television programming. Control unit 210 may execute instructions to send viewing history information to another device, such as backend server 110. Control unit 210 may also receive information and/or instructions from other devices, such as backend server 110.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store viewing history information to send at a later point in time, such as when requested by backend server 110, at a particular interval, or as viewing events occur.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables video client 140 to communicate with other devices and/or systems. For example, network connection 240 may include an Ethernet interface, an optical interface, a coaxial interface, a radio interface, or the like. Network connection 240 may allow for wired and/or wireless communication. Network connection 240 may be configured to connect video client 140 to a packet-based IP network.

Input/output devices 250 may generally include user input devices such as external buttons, and output devices, such as LED indicators. With input/output devices 250, a user may generally interact with video client 140. In some implementations, input/output devices 250 may be implemented via a remote control. Bus 260 may provide an interface through which components of video client 140 can communicate with one another.

As will be described in detail below, video client 140 may perform certain operations relating to recording and communicating a history of viewer activities to a server, such as backend server 110. Video client 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of video client 140, in other implementations, video client 140 may include fewer, additional, different and/or differently arranged components than those depicted in FIG. 2. In still other implementations, one or more components of video client 140 may perform one or more other tasks described as being performed by one or more other components of video client 140.

Figure 3:
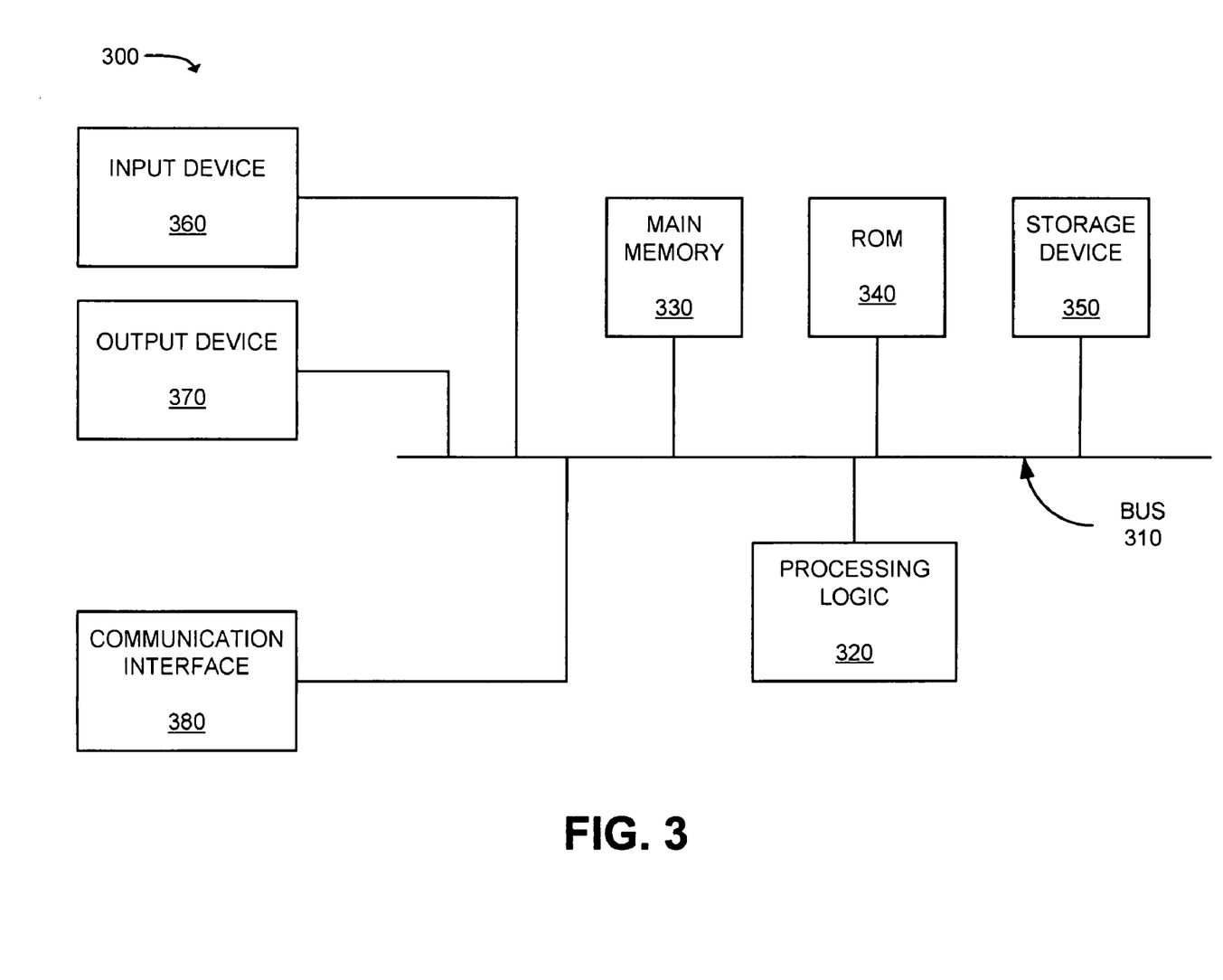
FIG. 3 is a block diagram of exemplary components of a device that may correspond to the backend server and/or analysis server of FIG. 1.

FIG. 3 is a diagram of exemplary components of a device 300 that may correspond to backend server 110 and/or analysis server 120. As illustrated, device 300 may include a bus 310, processing logic 320, a main memory 330, a read-only memory (ROM) 340, a storage device 350, an input device 360, an output device 370, and a communication interface 380.

Bus 310 may include a path that permits communication among the components of device 300. Processing logic 320 may include a processor, microprocessor, or other type of processing logic, such as an application-specific integrated circuit (ASIC), field-programmable gate array (FPGA), etc., that may interpret and execute instructions.

Main memory 330 may include a RAM or another type of dynamic storage device that stores information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 130. Storage device 350 may store viewer activity history for particular video clients 140 or all video clients 140 associated with a subscription television service provider.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as video client 140.

As will be described in detail below, device 300 may perform certain operations associated with providing dynamic PPV pricing for a subscription television service. Server device 300 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, additional, different and/or differently arranged components than those depicted in FIG. 3. In still other implementations, one or more components of device 300 may perform one or more other tasks described as being performed by one or more other components of device 300.

Figure 4:
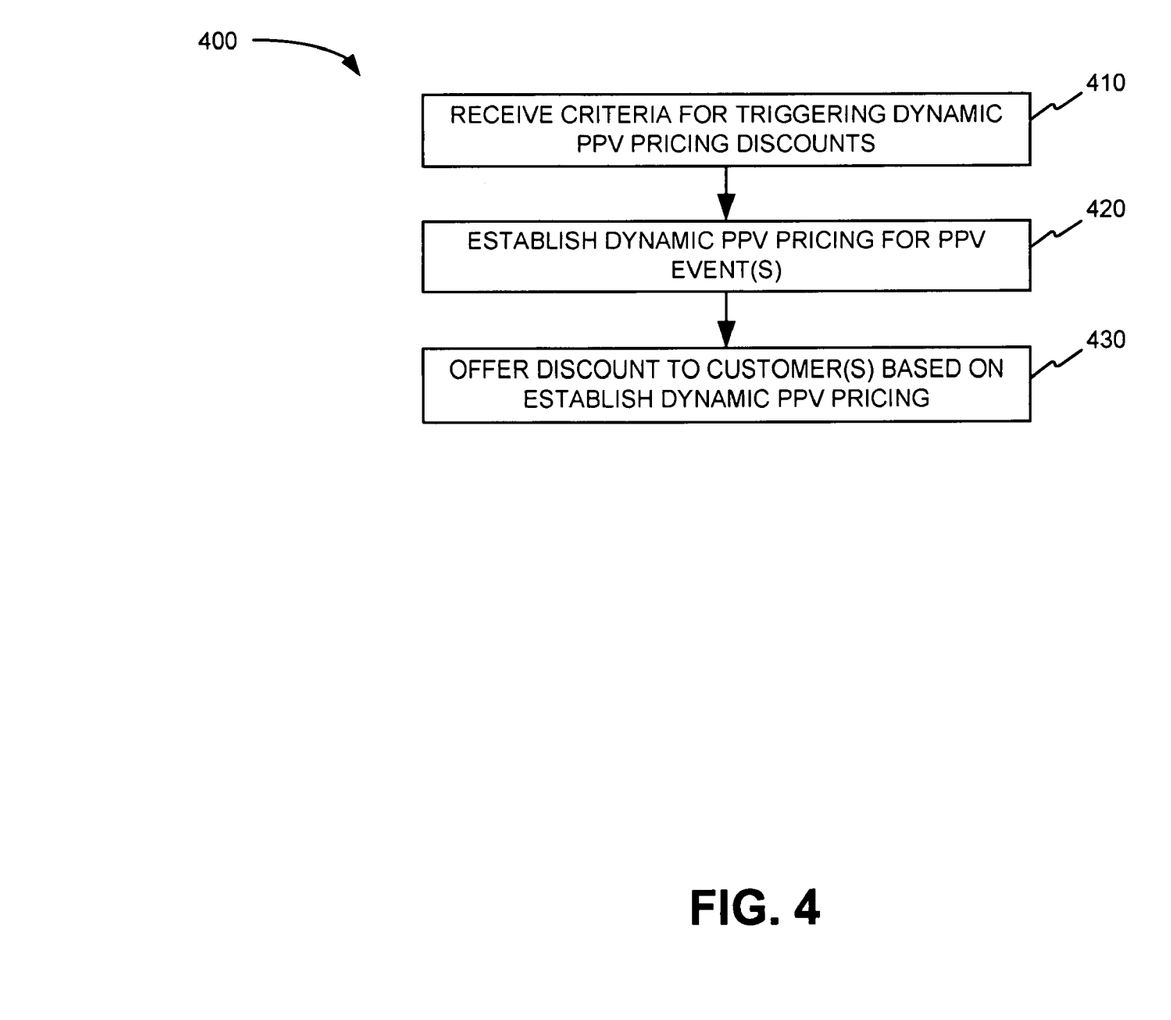
FIG. 4 is a process flow illustrating exemplary operations to offer dynamic discount pricing of pay-per-view (PPV) events.

FIG. 4 provides a process flow 400 illustrating exemplary operations for offering dynamic discount pricing of PPV events. The operations may be performed by one or more servers associated with a subscription television service, such as backend server 110 and/or analysis server 120. In some implementations, certain operations may also be performed by one or more video clients 140.

Process 400 may begin with receiving criteria for triggering dynamic PPV pricing discounts (block 410). Criteria may be supplied, for example, based on decisions by project management to set and achieve product revenue goals. Criteria may be provided for a particular PPV event, a PPV event series, and/or all PPV events. Particular criteria to trigger discounted PPV pricing may include, for example, criteria for take rate comparisons, viewer profiles, real-time behavior, and/or remaining PPV event duration. Dynamic PPV pricing criteria is described further with respect to FIG. 5.

Figure 5:
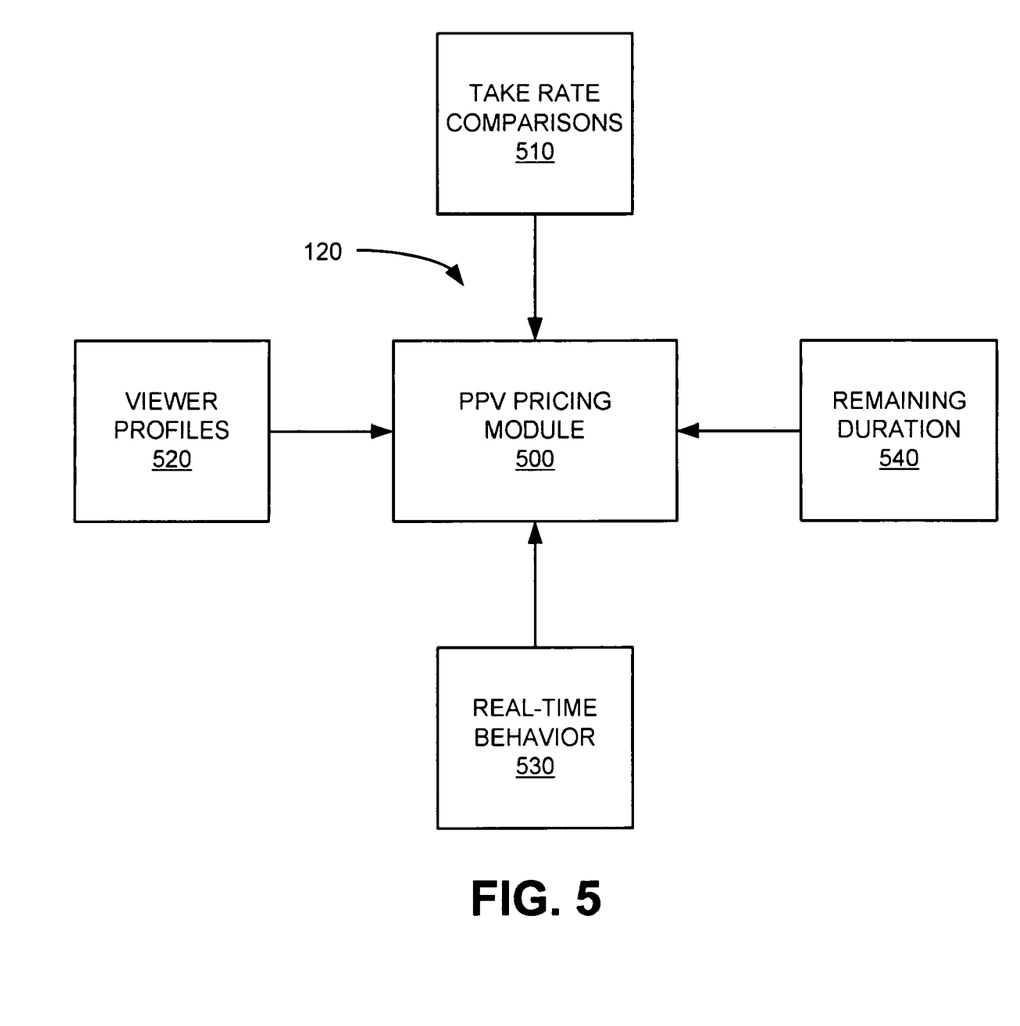
FIG. 5 is a diagram of exemplary factors provided to a PPV pricing module.

FIG. 5 is a diagram of exemplary criteria provided to a PPV pricing module 500. Price utility module 500 (included, for example, within analysis sever 120) may incorporate take rate comparisons 510, viewer profiles 520, real-time behavior 530, and/or remaining duration 540 to derive the price of an available PPV event.

Take rate comparisons 510 may include comparisons of the median take rate of previous PPV events, such as PPV events in the same or similar categories or PPV events in the same series. The median take rates (for the series and/or categories) may be compared against the current take rate for a particular PPV event and/or against take rates from other historical time periods. In one implementation, criteria for take rate comparisons 510 may be expressed as a ratio. The current take rate may be obtained, for example, as real-time or near real-time data from backend server 110 during a PPV event.

Viewer profiles 520 may include information for individual video clients 140 and/or clusters of video clients 140. For example, backend server 110 may collect viewer history information from various video clients, such as video clients 140. Video clients 140 may identify particular viewer actions (e.g., programs watched, searches performed, and/or programs ordered) and provide data over a network (e.g., network 140) to a backend server 110. Backend server 110 may compile and sort the collected viewer history information locally and/or in a database, such as database 130. Analysis server 120 may determine a relevancy function based data from viewers and data collected from programming content. Analysis server 120 may identify groups of video clients 140 based on the weighted relevancy function. For example, a global group may include the tendencies of all subscriber video clients 140. Other clusters may be identified within the global group. For example, certain groupings may become apparent based on types of weighted action objects and/or viewing times from each video client 140 viewer history.

Once a group is defined, analysis server 120 may indicate viewing tendencies for that particular group. A tendency profile may include predicted actions for viewers within the cluster. For example, some clusters may have a viewing history that includes high PPV usage for a particular category of PPV events (e.g., mixed martial arts), while little to no usage for other PPV categories (e.g., professional wrestling, college football, or live concerts). Other patterns may be identified, including times of peak use within a cluster, types of non-PPV programming associated with a cluster, preferred channels, programming variations between timeslots, etc. These patterns may be used to determine tendencies for particular clusters that may optionally be used to establish pricing criteria for PPV events.

Backend server 110 may assign and send one or more cluster identifiers to video client 140. A cluster identifier may be a character string and/or number that identifies a cluster. Video client 140 may store the cluster identifiers and include them in messages to backend server 110. In an exemplary implementation, each video client 140 may be assigned to a hierarchy of groupings including a global grouping, one or more clusters, and an individual video client. Thus, video client 140 may store more than one cluster identifier.

Viewer profiles 520 may include indications of interest in a particular category that matches a particular PPV event. For example, a viewer profile may indicate a preference for boxing programs on standard television channels and that preference may be weighted toward a price discount for a PPV boxing event. Viewer profiles 520 may also include whether a PPV event has ever been purchased through a particular video client 140 before. For example, a larger discount may be offered to previous PPV purchasers than to non-purchasers. Furthermore, discounts may be offered based on the number of previous PPV purchases made through a particular video client 140.

Real-time behavior 530 may include behavior of the global subscriber group and/or the behavior of subscribers who ordered the PPV event. For example, real-time behavior of the global subscriber group may include the current take rate for a particular event as well as other indications of customer interest, such as electronic program guide searches or interactive chat rooms related to a PPV event. Behavior of subscribers who ordered the PPV event may include, for example, how many purchasers are actually tuned in to the PPV event and whether the viewing audience increases/decreases throughout the duration of the PPV event.

Remaining duration 540 may include the total scheduled time for the PPV event minus the elapsed time. For example, a three-hour PPV event may be discounted in increments based on the remaining duration, such that a smaller discount may be offered up to the end of the first hour, a larger discount between the first and second hours, and no discount during the third hour.

The criteria for dynamic PPV pricing may be applied to individual customers, subsets (e.g., clusters) of customers, or all customers. Criteria for take rate comparisons 510, viewer profiles 520, real-time behavior 530, and/or remaining duration 540 may be used individually or in combination to determine if a discount for a PPV event is to be offered and to what extent.

Referring back to FIG. 4, dynamic PPV pricing for one or more PPV events may be established (block 420). For example, analysis server 120 may use a PPV pricing module 500 to establish PPV pricing based on the variety of criteria described above. Data for each of take rate comparisons 510, viewer profiles 520, real-time behavior 530, and/or remaining duration 540 may be retrieved from, for example, database 130 or from real-time statistics provided from backend server 110.

In certain implementations, the criteria may be applied as a static threshold or as a discount function. For example, as a static threshold, PPV pricing module 500 may apply data from rate comparisons 510, viewer profiles 520, real-time behavior 530, and/or remaining duration 540 to one or more threshold criteria. If particular threshold criteria are achieved, then a set discount associated with that criteria may be applied. For example, if a current take-rate is below 50% of the target take rate and the remaining duration of the PPV event reaches 85%, then PPV pricing module 500 may identify a particular discount.

A PPV discount function may be an equation that establishes differential pricing to generate more PPV orders. The PPV discount function may incorporate past statistics, such as information from viewer profiles, previous PPV order history, and/or take rates for similar PPV events. In one implementation the past statistics may be weighted based on input from an operator. PPV pricing module 500 may adjust pricing for a particular PPV event, for example, as a function of remaining duration, current take rate, and or other real-time factors.

In an exemplary scenario, PPV pricing module 500 may be set to trigger discount pricing for new PPV users (e.g., based on viewer profiles 520) only if the current take rate for a PPV event is below the median take rate for other PPV events in the same series. In another exemplary scenario, PPV pricing module 500 may trigger discount pricing if the current take rate is below a target take rate and the overall viewership (e.g., based on real-time behavior 530) is decreasing. In one more exemplary scenario, discount pricing may be triggered if the current take rate is below a target take rate and the take rates for the PPV category and series corresponding to a particular PPV event (e.g., based on take-rate comparisons 510) have been historically low for a season.

Still referring to FIG. 4, a discount may be offered to one or more customers based on the established dynamic PPV pricing (block 430). For example, based on the determination of analysis server 120 (e.g., applying PPV pricing module 500), the subscription television service (e.g., backend server 110) may distribute a particular PPV discount offer to individual video clients 140, clusters, or all video clients 140 associated with the subscription television service provider. The PPV discount offer may include discount pricing for one or more particular PPV events.

In one implementation, backend server 110 may provide, to video clients 140, a discount price for a particular PPV event and instructions for displaying the discount price to the subscriber. As changes to the discount price occur (e.g., based on the application of changing data to the criteria), backend server 110 may provide, to video clients 140, updates/changes to the discount price.

In another implementation, backend server 110 and/or analysis server 120 may prepare a pricing list that can be used by video client 140 to locally determine the discount price for a particular PPV event. For example, based on the PPV discount function for a particular PPV event, backend server 110 and/or analysis server 120 may prepare a pricing list for each video client 140 or cluster. The pricing list may be specific to a cluster or customer associated with a particular profile. The pricing list may include, for example, discounts/prices that can be applied at particular times or remaining duration points of the PPV event. The pricing list may be sent to select video clients 140, where they can be applied locally, based on viewer activity at local video client 140.

In still another implementation, backend server 110 and/or analysis server 120 may provide the PPV discount function for a particular PPV event to video clients 140 so that each video client 140 may calculate the PPV discount pricing without the use of a price list. In addition to the PPV discount function, backend server 110 and/or analysis server 120 may provide addition real-time (or near-real time) data of other subscribers (e.g., viewer retention rates for particular PPV events), to supplement the PPV discount function.

The PPV pricing information (e.g., the actual price, the pricing list, PPV discount function, etc.) may be received by each video client 140 and integrated into a template, for example, to display to a viewer via video display device 150. In one implementation, PPV discount pricing may be integrated into listings shown on an electronic program guide. In another implementation, PPV discount pricing may be included with program guide trailers. In some implementations, the pricing may be integrated into a traditional PPV order screen (e.g., the PPV selection screen appears as a typical PPV selection screen except that the price of the PPV event may be different). In other implementations, a traditional PPV selection screen may be modified to include other information that indicates a limited duration for the pricing. In still other implementations, a dedicated PPV selection screen or window overlay may be used to present the PPV discount pricing to the customer.

In still another implementation, PPV discount pricing information may be provided to a customer via other communication mechanisms. For example, a customer may be informed of PPV event discounts via automated text messages or e-mails sent to an account associated with the customer. A combination of pricing indications may also be used. For example, customers may be able to select one or more ways that PPV discounted pricing information may be presented.

Figure 6A:
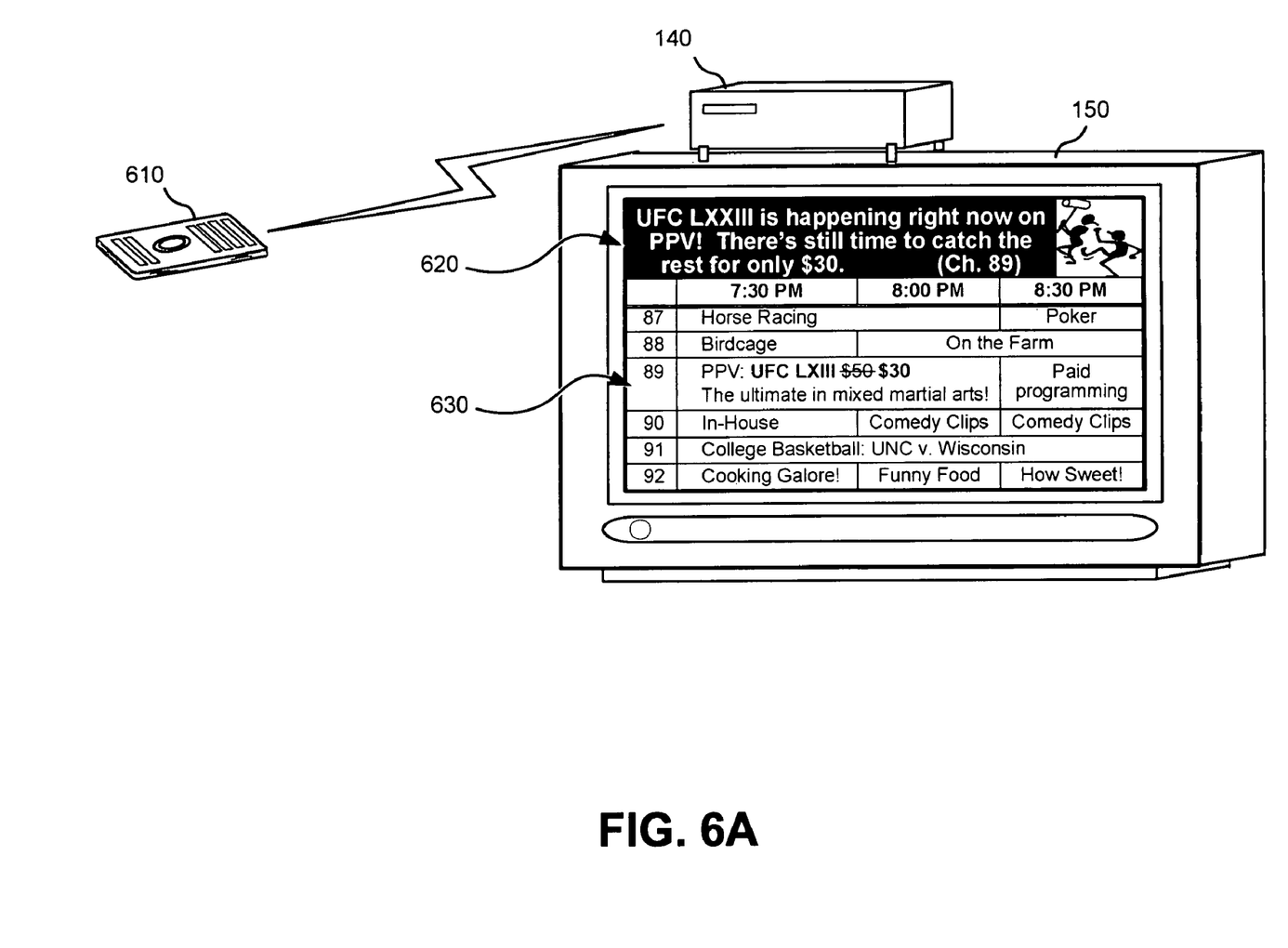
FIGS. 6A and 6B are exemplary diagrams illustrating implementations of a customer interface for dynamic discount pricing of PPV events.
Figure 6B:
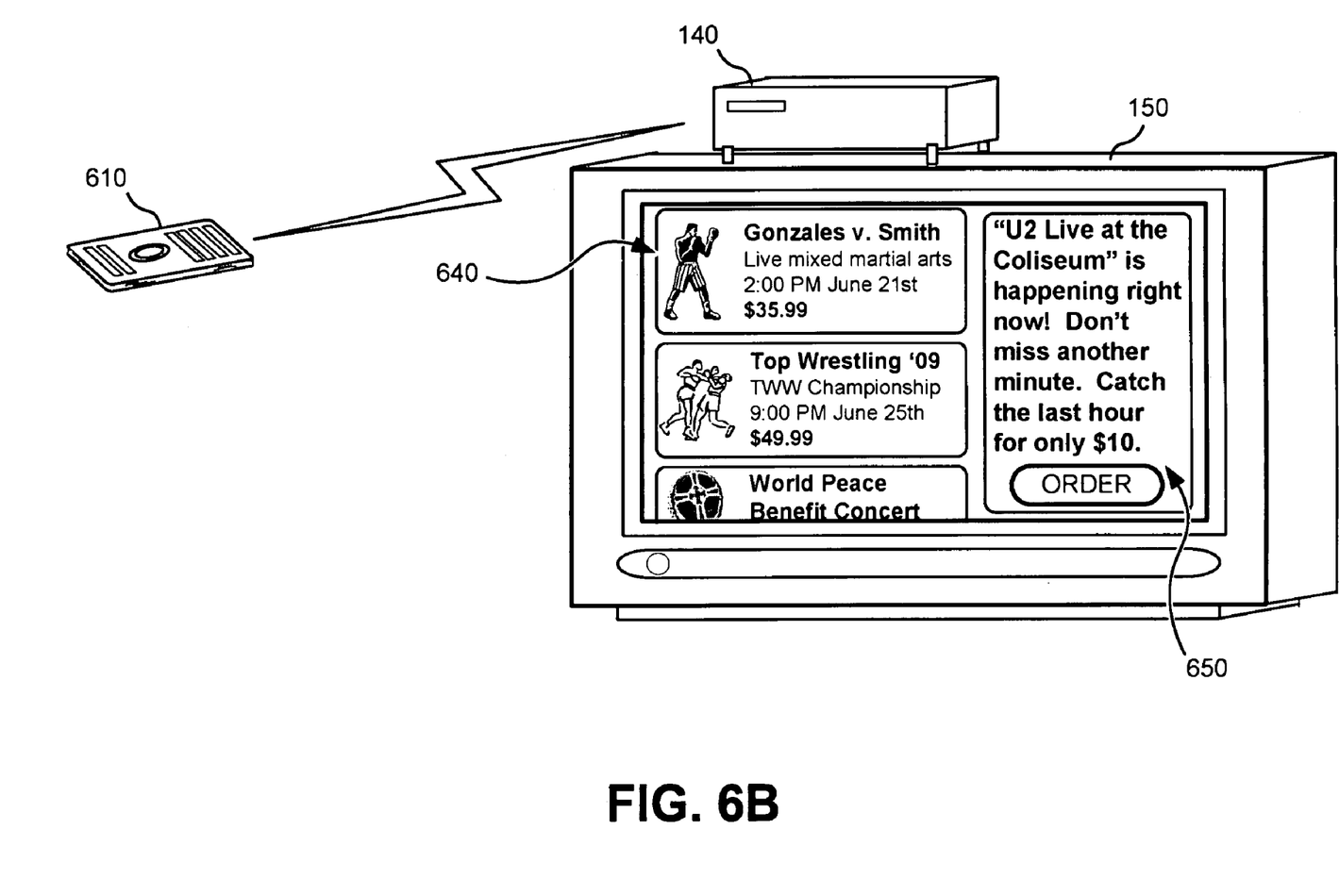

FIGS. 6A and 6B provide exemplary diagrams illustrating implementations of a customer interface for dynamic discount pricing of PPV events according to systems and/or methods described herein. More specifically, FIG. 6A provides an exemplary diagram of an electronic program guide screen that includes indications of a discounted PPV event, and FIG. 6B provides an exemplary diagram of a dedicated PPV selection screen that includes indications of another discounted PPV event.

Referring to FIG. 6A, a viewer may view an electronic program guide screen on video display device 150. The electronic program guide screen may include a notice, such as notice 620 displayed on video display device 150 of FIG. 6A, that discounted pricing for a PPV event is available (e.g., for a limited time period). In one implementation, notice 620 may include a link to the discounted PPV event. The viewer may select (e.g., via remote control 610) the link from the notice 620. In the example of FIG. 6A, video client 140 may cause display device 150 to present notice 620 to inform a viewer that the duration of a particular PPV event (e.g., "UFC LXXIII") is available for a discounted price. In notice 620, the amount of the PPV event discount is not shown (e.g., the original price of "UFC LXXIII" is not presented to the user). In other implementations, discount pricing may be expressly shown (e.g., both original and discount prices may be displayed), provided as a percentage (e.g., 50% off), or presented in another manner.

Additionally and/or alternatively, the electronic program guide may include discounted pricing information in a channel listing 630 corresponding to the PPV event item. As shown in FIG. 6A, channel listing 630 may present the channel number (e.g., "89"), the PPV event title (e.g., "UFC LXXIII"), the remaining duration of the PPV event (e.g., until 8:30 PM), and the discount pricing (e.g., reduced from $50 to $30). Additional and/or different information (e.g., a PPV event description) may also be included. The viewer may select the PPV event, for example, by tuning to the designated channel (e.g., channel "89") using, for example, remote control 610.

In one implementation, selecting the designated channel of channel listing 630 or the link in notice 620 may bring the viewer to a designated PPV order screen, shown in FIG. 6B. In another implementation, a viewer may navigate to the designated PPV order screen by other techniques. The designated PPV order screen of FIG. 6B may include listings of current and upcoming PPV events. Listing 640, for example, shows an upcoming PPV event (e.g., "Gonzales v. Smith") that has not yet started and, subsequently, may not be a candidate for discounting. It should be noted, in other implementations, that PPV event discounting may be applied before the start of a PPV event. The designated PPV order screen may also include a notice, such as notice 650, that discounted pricing for a current PPV event (e.g., "U2 Live at the Coliseum") is available. In one implementation, notice 650 may include a link to the discounted PPV event. The viewer may select (e.g., via remote control 610) the link from the notice 650 to order the PPV event and gain access to the program via video client 140 and backend server 110. Backend server 110 may receive the PPV event order from video client 140 and provide the pay-per-view event to the video client 140 for presentation to the viewer.

The illustrations of FIGS. 6A and 6B are exemplary formats for promoting PPV event discounts. Other formats may be used. Additionally and/or alternatively, a viewer may be informed of discounted PPV event pricing through advertising on other channels, overlaid windows, data scrolls, and/or start-up screens.

Systems and/or methods described herein may be implemented by one or more computing devices within a subscription television network. The computing devices may offer PPV event programming to viewers at dynamically discounted prices. The computing devices may receive criteria for triggering dynamic pricing discounts for a pay-per-view event and establish, based on the received criteria, dynamic prices for the pay-per-view event. The computing devices may also offer, to the viewers over the subscription television network, the pay-per-view event at one of the established dynamic prices.

Dynamic PPV pricing may be offered to customers to maximize the revenue of limited duration events. Once the PPV event duration elapses without a customer purchase, the programming provider has lost that capacity of making a sale in that time window forever. Customers may be offered a discount on a PPV event such that the marginal revenue through incremental sales remains higher than the cost. Thus, implementations described herein increase the probability that the programming provider may make some incremental revenue, instead of nothing for current PPV programming, as long as the offered price is higher than cost.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIG. 4, the order of the blocks may differ in other implementations. Further, non-dependent blocks may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code-it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more devices within a subscription television network that offers pay-per-view programming to viewers, the method comprising:
  receiving, by the one or more devices, criteria for triggering dynamic pricing discounts for a pay-per-view event;
  establishing, by the one or more devices and based on the received criteria, dynamic prices for the pay-per-view event,
    the received criteria including viewer profile historical information and real-time behavior of the viewers,
    the dynamic prices for the pay-per-view event changing based on a number of viewers that currently view the pay-per-view event,
    the dynamic prices for the pay-per-view event changing based on an increase or a decrease in the number of viewers that currently view the pay-per-view event at a first time and a second time, and
    the dynamic prices for the pay-per-view event changing based on historical information related to one or more other pay-per-view events that are similar to the pay-per-view event; and offering, by the one or more devices and to the viewers over the subscription television network, the pay-per-view event at one of the established dynamic prices.

2. The method of claim 1, where the criteria for triggering the dynamic pricing discounts includes:
a target take rate; or
a remaining duration of the pay-per-view event.

3. The method of claim 1, where the establishing the dynamic prices for the pay-per-view event comprises:
obtaining a current take rate for the pay-per-view event;
comparing the current take rate to a target take rate; and
applying a discounted price to the pay-per-view event if the current take rate is less than the target take rate.

4. The method of claim 1, where the dynamic prices for the pay-per-view event are determined based on one or more threshold values for the criteria.

5. The method of claim 1, where the dynamic prices for the pay-per-view event are determined based on a function of one or more of a remaining duration of the pay-per-view event or a take rate.

6. The method of claim 1, where offering, to the viewers over the subscription television network, the pay-per-view event at the one of the established dynamic prices comprises:
sending a current price of the pay-per-view event to one or more video clients associated with the viewers.

7. The method of claim 1, where offering, to the viewers over the subscription television network, the pay-per-view event at the one of the established dynamic prices comprises:
sending a price list of the pay-per-view event to one or more video clients associated with the viewers.

8. The method of claim 1, where offering, to the viewers over the subscription television network, the pay-per-view event at the one of the established dynamic prices comprises:
sending a pricing function for the pay-per-view event to one or more video clients associated with the viewers, the pricing function being based on the received criteria for triggering dynamic pricing discounts and a viewer profile.

9. The method of claim 1, where offering, to the viewers over the subscription television network, the pay-per-view event at the one of the established dynamic prices comprises:
sending instructions to a video client associated with each of the viewers, where the instructions instruct the video client to indicate discounted pay-per-view event pricing on a dedicated pay-per-view event screen, an electronic program guide, or a start-up screen.

10. A system, comprising:
a memory to store instructions; and
a processor to execute the instructions to:
receive criteria for discounting a price of a pay-per-view event,
the received criteria including viewer profile historical information and real-time behavior of the viewers,
the price for the pay-per-view event changing based on a number of viewers that currently view the pay-per-view event,
the price for the pay-per-view event changing based on an increase or a decrease in the number of viewers that currently view the pay-per-view event at a first time and a second time, and
the price for the pay-per-view event changing based on historical information related to one or more other pay-per-view events that are similar to the pay-per-view event;
establish, based on the received criteria and viewing data received from one or more video clients, discounted price information for the pay-per-view event, and
send the discounted price information to at least one of the one or more video clients.

11. The system of claim 10, where the criteria for discounting the price of the pay-per-view event includes:
a target take rate; or
a remaining duration of the pay-per-view event.

12. The system of claim 11, where the viewer profile information includes:
logical groupings of video clients based on viewing history data; and
viewing tendencies of the logical groupings.

13. The system of claim 10, where, when establishing, based on the received criteria and the viewing data received from one or more video clients, discounted price information for the pay-per-view event, the processor is further to execute instructions to:
determine a remaining duration for the pay-per-view event;
obtain a current take rate for the pay-per-view event;
compare the current take rate to a target take rate; and
apply a discounted price to the pay-per-view event based on the remaining duration and the comparison of the current take rate to the target take rate.

14. The system of claim 10, where the criteria for discounting the price of the pay-per-view event is expressed as a threshold value.

15. The system of claim 10, where the criteria for discounting the price of the pay-per-view event is expressed as a function of a remaining duration of the pay-per-view event.

16. The system of claim 10, where the processor is further to execute instructions to:
receive an order, from one of the video clients, for the pay-per-view event; and
provide, to the one of the video clients, the pay-per-view event.

17. A method implemented at a video client, the method comprising:
receiving, from a server, discounted pricing information for a pay-per-view event, the discounted pricing information including different prices for the pay-per-view event, the different prices being based on:
viewer profile historical information associated with a viewer and real-time behavior of other viewers,
a number of viewers that currently view the pay-per-view event,
an increase or a decrease in the number of viewers that currently view the pay-per-view event at a first time and a second time, and
historical information related to one or more other pay-per-view events that are similar to the pay-per-view event;
providing, for presentation and to a display device, one of the different prices based on the viewer profile historical information;
receiving, from the viewer, an order request for the pay-per-view event; and
sending, to the server, the order request for the pay-per-view event.

18. The method of claim 17, where the providing for presentation includes providing, for presentation, the one of the different prices within a pay-per-view order screen, an electronic program guide, or a start-up screen.

19. A non-transitory computer-readable storage medium storing computer-executable program instructions, the instructions comprising:

one or more instructions which, when executed by at least one processor, cause the at least one processor to obtain criteria for dynamic pricing discounts for a pay-per-view event, the criteria including:
 viewer profile historical information associated with a video client,
 real-time behavior of other video clients,
 a number of other video clients that currently view the pay-per-view event,
 an increase or a decrease in the number of other video clients that currently view the pay-per-view event at a first time and a second time, and
 historical information related to one or more other pay-per-view events that are similar to the pay-per-view event,
one or more instructions which, when executed by the at least one processor, cause the at least one processor to establish, based on the obtained criteria, at least one discounted price for the pay-per-view event,
one or more instructions which, when executed by the at least one processor, cause the at least one processor to send, to the video client, an indication of the at least one discounted price for the pay-per-view event, the indication including instructions for presenting the at least one discounted price for the pay-per-view event on a display, and
one or more instructions which, when executed by the at least one processor, cause the at least one processor to receive, from the video client, an order for the pay-per-view event.

20. The medium of claim 19, where the criteria for the dynamic pricing discounts for the pay-per-view event further comprises:
 a take rate ratio.

* * * * *